United States Patent [19]
Yoon

[11] Patent Number: 6,034,994
[45] Date of Patent: Mar. 7, 2000

[54] METHOD FOR CONTROLLING THE POINT OF TIME WHEN BYPASS MODE OPERATION IS BEGUN, BASED ON THE FORMAT OF PCM DATA

[75] Inventor: Joon Sang Yoon, Kyoungki-do, Rep. of Korea

[73] Assignee: Hyundai Electronics Industries Co., Ltd., Rep. of Korea

[21] Appl. No.: 08/998,336

[22] Filed: Dec. 23, 1997

[30] Foreign Application Priority Data

Jun. 30, 1997 [KR] Rep. of Korea .............. 97-29868

[51] Int. Cl.⁷ .................................................. H04B 14/04
[52] U.S. Cl. ................... 375/242; 375/219; 375/241; 375/354; 704/212; 704/221
[58] Field of Search ........................... 375/213, 219, 375/222, 241, 242, 295, 316, 354, 377; 704/212, 221, 228, 267; 379/156, 242; 455/73

[56] References Cited

U.S. PATENT DOCUMENTS

| | | |
|---|---|---|
| 5,491,719 | 2/1996 | Sellin et al. .............. 375/213 |
| 5,768,308 | 6/1998 | Pon et al. ................. 375/219 |
| 5,793,810 | 8/1998 | Han et al. ................. 375/242 |
| 5,903,862 | 5/1999 | Weaver, Jr. et al. ........ 704/212 |
| 5,956,673 | 9/1999 | Weaver, Jr. et al. ........ 704/221 |

*Primary Examiner*—Stephen Chin
*Assistant Examiner*—Chieh M. Fan
*Attorney, Agent, or Firm*—Saliwanchik, Lloyd & Saliwanchik

[57] ABSTRACT

A method for controlling the point of time when a bypass mode operation is begun, based on the format of pulse code modulation (PCM) data. A switching unit, which is coupled between outgoing-end and incoming-end mobile stations, receives signals output from vocoders respectively associated with the outgoing-end and incoming-end mobile stations, thereby checking respective operation modes of the vocoders. Based on the result of the checking, the switching unit controls the vocoders so that communications between the outgoing-end and incoming-end mobile stations can be enabled when both the mobile stations operate in a bypass mode. Accordingly, it is possible to achieve smooth communications without a degradation in speech quality, as compared to conventional communications methods which do not take into consideration operation modes of outgoing-end and incoming-end mobile stations.

4 Claims, 4 Drawing Sheets

METHOD FOR CONTROLLING THE POINT OF TIME WHEN BYPASS MODE OPERATION IS BEGUN, BASED ON THE FORMAT OF PCM DATA

BACKGROUND OF THE INVENTION

1. Field of the Invention

The present invention relates to a method for controlling the point of time when a bypass mode operation is begun, based on the format of pulse code modulation (PCM) data, and more particularly to a method for controlling the point of time, when a bypass mode operation is begun, based on a determination carried out in a switching unit, coupled to the vocoder, for the format of PCM data sent from the vocoder, in order to reduce errors generated due to a difference between the points of time when respective bypass mode operations of outgoing-end and incoming-end vocoders are begun.

2. Description of the Prior Art

A number of research efforts have been made to provide a method for improving speech quality to obtain improved call services in mobile-to-mobile (M-to-M) communications carried in a switching unit of a communications system, in particular, a digital mobile communications system.

FIG. 1 is a flow chart illustrating a bypass mode operation executed in a vocoder in accordance with a conventional call processing method. As shown in FIG. 1, the bypass mode operation involves an M-to-M recognition step 10 for recognizing a bypass command contained in an alarm, received at an optional switching unit, informing of the request for a call service, and recognizing the request for M-to-M communications, an incoming step 20 for receiving, at an incoming-end mobile station, a call signal sent from the switching unit after the execution of the M-to-M recognition step 10 and beginning a bypass operation in a vocoder associated with the incoming-end mobile station, and an outgoing step 30 for beginning a bypass operation in a vocoder associated with the outgoing-end mobile station after the execution of the incoming step 20, thereby enabling M-to-M communications.

Now, a conventional method for controlling the point of time, when the bypass mode operation of each vocoder is begun, in a call processing procedure.

In accordance with the conventional method, when a user sends a signal for requesting M-to-M communications to an associated switching unit, the switching unit recognizes a bypass command and M-to-M communications request data contained in the alarm informing of the request for a call service (M-to-M recognition step 10). Accordingly, the switching unit sends desired messages to outgoing-end and incoming-end mobile stations, respectively.

When the incoming-end mobile station receives the message from the switching unit, the incoming-end vocoder begins its bypass operation (incoming step 20). Thereafter, the outgoing-end vocoder begins its bypass operation. Thus, M-to-M communications can be enabled.

In accordance with the above-mentioned method adapted to control the bypass mode operations of vocoders for a call processing, normal communications between outgoing-end and incoming-end mobile stations can be enabled only when the vocoder associated with the outgoing mobile station begins a bypass mode operation within 20 to 40 msec after the vocoder associated with the incoming mobile station begins a bypass mode operation. For this reason, where the difference between the points of time when respective bypass mode operations are begun is undesirably lengthened due to a failure or error generated in the system, the vocoder associated with the outgoing mobile station may operate erroneously.

U.S. Pat. No. 5,491,719 describes a technique for reducing the generation of errors during transmissions of PCM data.

This patent discusses a system for handling data errors on a cellular communications system PCM link in order to reduce data errors generated during transmissions of PCM data. The system includes a switching unit and a base station. The switching unit includes means for coding speech signals, and a formatter for producing formatted data to be transmitted to the base station. The formatted data includes data to be actually transmitted, and an error detection code. The switching unit also includes means for detecting an error from a signal received from the base station and handling the detected error. The base station includes means for detecting an error from data received from the switching unit and handling the detected error, a channel encoder, a data transmitter for modulating data to be transmitted and transmitting the modulated data, a data receiver for receiving data from the switching unit and demodulating the received data, a channel decoder, and a formatter for producing formatted data to be transmitted to the switching unit, the formatted data including data to be actually transmitted and an error detection code.

In accordance with the system disclosed in the '719 patent, data is transmitted while including an error detection code by use of an error detection code generator for generating the error detection code for encoded speech and data signals and a formatter for formatting the error detection code and data to be transmitted, thereby producing formatted data to be finally transmitted. Upon receiving the transmitted data, it is determined whether or not an error is generated, based on the error detection code contained in the transmitted data. Thus, detection and handling of errors generated are achieved.

The system of U.S. Pat. No. 5,491,719 has an effect capable of transmitting data at a higher accuracy than PCM data. However, this system only reduces errors involved in data itself to be transmitted. The problem with this system is that it cannot reduce an error associated with the difference between the points of time when respective bypass mode operations are begun.

BRIEF SUMMARY OF THE INVENTION

Therefore, an object of the invention is to solve the above-mentioned problems involved in the prior art and to provide a method for controlling the point of time when a bypass mode operation is begun, based on a difference between the format of data to be transmitted in a bypass mode and data to be transmitted in a vocoding mode.

In accordance with the present invention, this object is accomplished by providing a method for controlling the bypass mode operation of a vocoder based on the format of pulse coded modulation (PCM) data, comprising: mobile-to-mobile recognition step for allowing a switching unit to recognize a bypass command contained in an alarm, received at the switching unit when an optional user requests a call service, informing of the request for the call service, and to recognize the request of the user to be the request for mobile-to-mobile communications between outgoing-end and incoming-end mobile stations; incoming step for beginning a control for a bypass operation of a vocoder associated with the incoming-end mobile station when an output signal from the switching unit is received at the incoming-end mobile station after the execution of the mobile-to-mobile recognition step; outgoing-end control step for controlling a bypass mode operation of a vocoder associated with the outgoing-end mobile station, based on data output from the incoming-end vocoder after the execution of the incoming step; incoming-end control step for controlling a bypass mode operation of the incoming-end vocoder, based on data output from the outgoing-end vocoder after the execution of the incoming step; and communications step for enabling M-to-M communications when the outgoing-end and incoming-end bypass operations coincide with each other after the execution of the outgoing-end and incoming-end control steps.

In a bypass mode, data is used which has a data format including 4 repeated byte strings each having a header of 7 bytes and a speech signal of 22 bytes. On the other hand, the data used in a general vocoding mode has a data format including sampling data of 160 bytes only having the form of speech signals.

Where a bypass mode operation is required for a transmission of PCM data, the format of PCM data sent from the switching unit to a vocoder is determined in order to control the point of time when a bypass mode operation of the vocoder is begun, in accordance with the present invention. In accordance with the present invention, communications between outgoing-end and incoming-end mobile stations can be enabled when PCM data respectively input at the outgoing-end and incoming-end vocoders coincide with each other.

BRIEF DESCRIPTION OF THE DRAWINGS

Other objects and aspects of the invention will become apparent from the following description of embodiments with reference to the accompanying drawings in which.

DETAILED DISCLOSURE OF THE INVENTION

Figure 1:
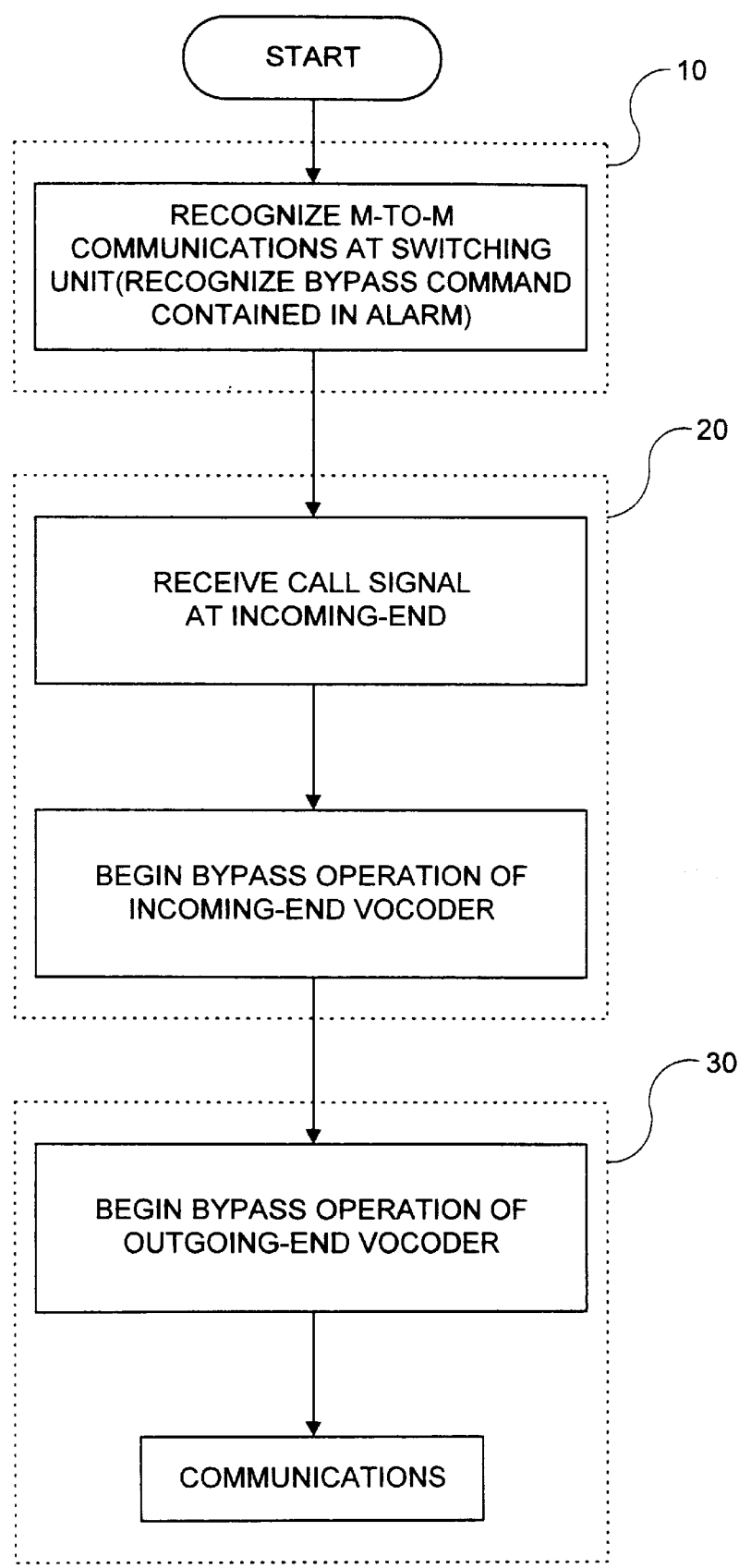
FIG. 1 is a flow chart illustrating a bypass mode operation executed in a vocoder in accordance with a conventional call processing method.
Figure 2:
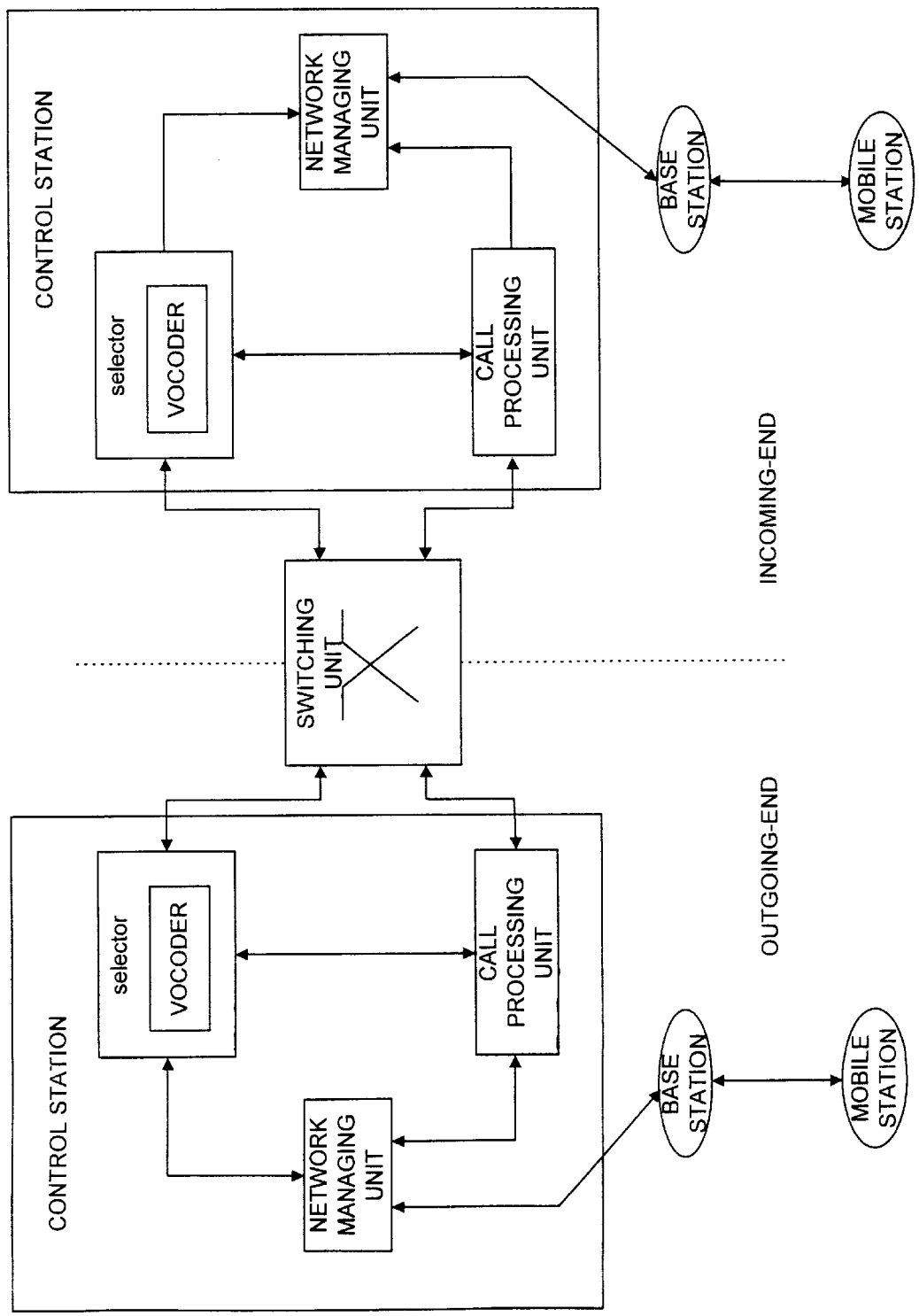
FIG. 2 is a block diagram illustrating a transmissions system, in which transmissions of PCM data are carried out, to which the present invention is applied.

FIG. 2 illustrates a transmissions system, in which transmissions of PCM data are carried out, to which the present invention is applied. As shown in FIG. 2, the transmissions system includes an outgoing-end system and an incoming-end system which have symmetrical configurations with respect to a switching unit, respectively. Each of the outgoing-end and incoming-end systems includes a mobile station, a base station and a control station. The control station includes a network managing unit, a call processing unit and a selector. A vocoder is included in the selector.

Figure 3:
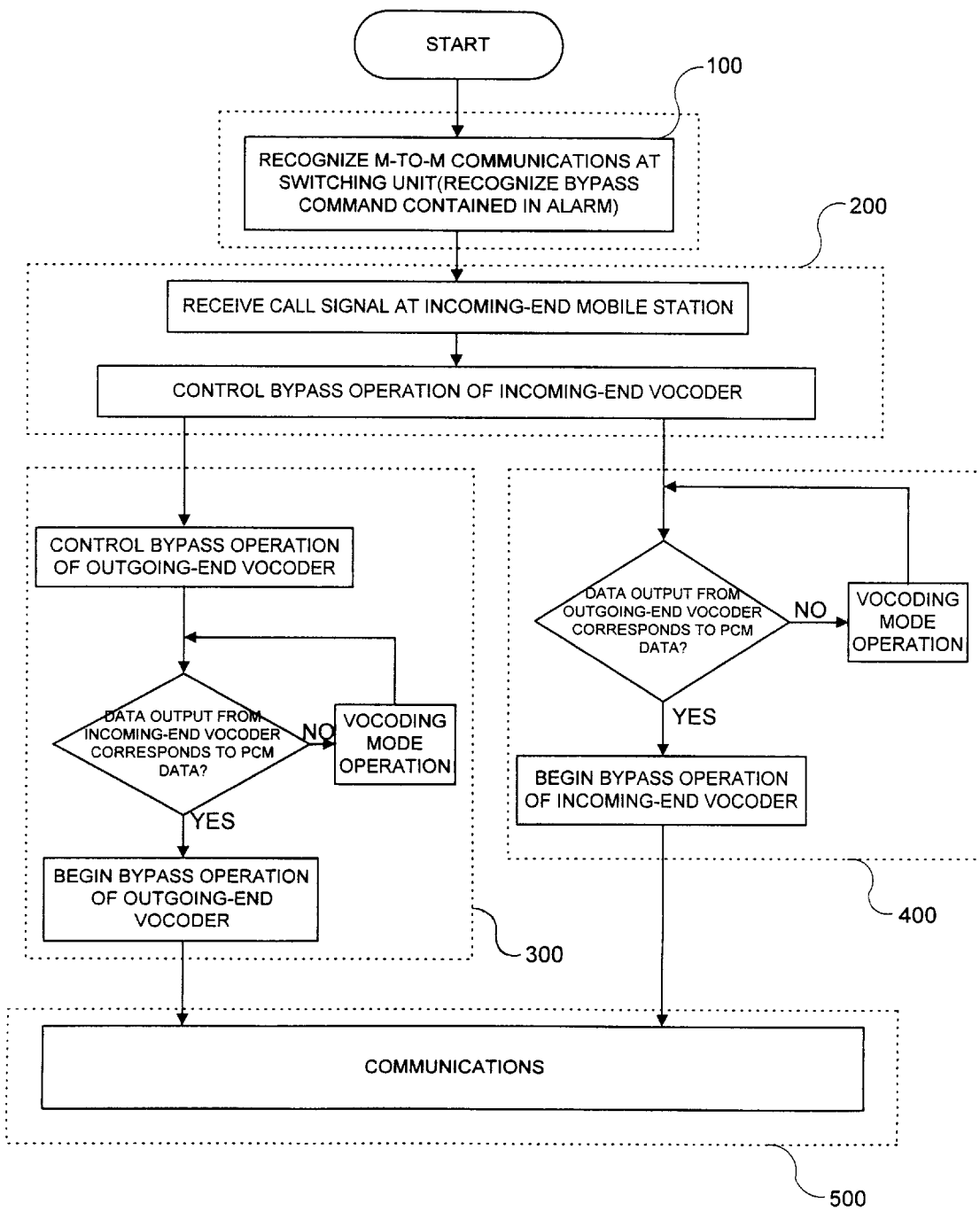
FIG. 3 is a flow chart illustrating a method for controlling the point of time, when a bypass mode operation of each vocoder in the communications system of FIG. 2 is begun, in accordance with the present invention.

Referring to FIG. 3, a method for controlling the point of time, when a bypass mode operation of each vocoder in the above-mentioned communications system is begun, in accordance with the present invention is illustrated.

As shown in FIG. 3, the control method of the present invention includes an M-to-M recognition step 100 for allowing the switching unit to recognize a bypass command contained in an alarm, received at the switching unit when an optional user requests a call service, informing of the request for the call service, and to recognize the request of the user to be the request for M-to-M communications, and an incoming step 200 for beginning a control for a bypass operation of the incoming-end vocoder when an output signal from the switching unit is received at the incoming-end system after the execution of the M-to-M recognition step 100. The control method also includes an outgoing-end control step 300 for beginning a control for a bypass operation of the outgoing-end vocoder after the execution of the incoming step 200, checking the format of data output from the incoming-end vocoder, controlling the outgoing-end vocoder to operate in a vocoding mode when it is determined that the data output from the incoming-end vocoder is general data, and then checking again the format of data output from the incoming-end vocoder while controlling the outgoing-end vocoder to begin its bypass mode operation when it is determined that the data output from the incoming-end vocoder is PCM data. The control method further includes an incoming-end control step 400 for checking the format of data output from the outgoing-end vocoder after the execution of the incoming step 200, controlling the incoming-end vocoder to operate in a vocoding mode when it is determined that the data output from the outgoing-end vocoder is general data, and then checking again the format of data output from the outgoing-end vocoder while controlling the incoming-end vocoder to begin its bypass mode operation when it is determined that the data output from the outgoing-end vocoder is PCM data. The control method further includes a communications step 500 for enabling M-to-M communications when the outgoing-end and incoming-end bypass operations coincide with each other after the execution of the outgoing-end and incoming-end control steps 300 and 400.

Figure 4:
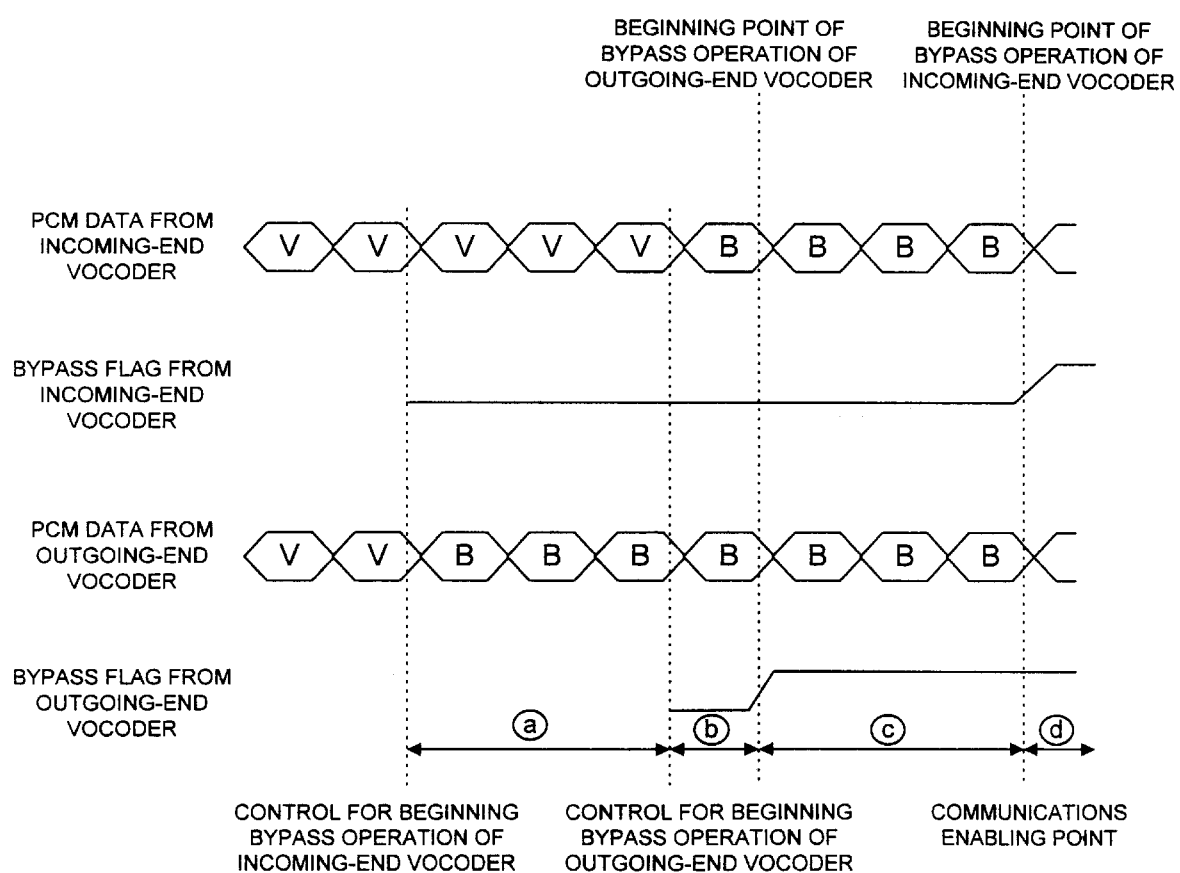
FIG. 4 is a timing diagram illustrating a control for the bypass mode operation of each vocoder in the communications system of FIG. 2 in accordance with the present invention.

Now, the procedure for enabling communications in a bypass mode in accordance with the above mentioned control method will be described in conjunction with FIG. 4. In FIG. 4, "V" represents a vocoding mode whereas "B" represents a bypass mode.

In FIG. 4, the interval a corresponds to an interval in which the outgoing-end vocoder requests bypass mode communications to the incoming-end while operating in a bypass mode. In the interval a, an alarm informing of the request for the bypass mode communications is generated from the switching unit. The interval b corresponds to an interval in which the incoming-end vocoder switches its operation mode to a bypass mode in response to the request of the outgoing-end. The interval c corresponds to an interval in which the outgoing-end begins its bypass operation in response to the mode switching of the incoming-end to the bypass mode. In the interval c, the incoming-end checks a signal sent from the outgoing-end. The interval d corresponds to an interval in which the incoming-end begins its bypass operation after completing its checking for the signal sent from the outgoing-end, thereby enabling communications between the outgoing-end and incoming-end.

This will be described in more detail.

When the outgoing-end vocoder sends a signal requesting M-to-M communications in a bypass mode to the switching unit, the switching unit analyzes the data sent from the outgoing-end vocoder, thereby recognizing the request for M-to-M communications. After recognizing the request for M-to-M communications, the switching unit determines whether or not the signal sent from the outgoing-end vocoder contains a bypass flag. Since the signal sent from the outgoing-end vocoder contains a bypass flag in this case, the switching unit recognizes the bypass mode of the outgoing-end vocoder. Accordingly, the switching unit sends a communications request signal and a signal informing of the bypass mode to the incoming-end vocoder. At the same time, the switching unit receives a signal output from the incoming-end mobile station, thereby determining the operation mode of the incoming-end mobile station. The switching unit sends a control signal to the outgoing-end vocoder when it is determined that both the outgoing-end and incoming-end mobile stations are set to a bypass mode, thereby controlling the outgoing-end vocoder to begin its bypass mode operation. When the bypass mode signals respectively output from the outgoing-end and incoming-end mobile stations coincide with each other, the switching unit sends a control signal to the incoming-end vocoder, thereby controlling the incoming-end vocoder to begin its bypass mode operation. As both the outgoing-end and incoming-end mobile stations operate in their bypass modes, as mentioned above, M-to-M communications between the outgoing-end and incoming-end mobile stations can be enabled.

As apparent from the above description, the present invention provides a method for controlling the points of time when respective bypass operations of outgoing-end and incoming-end vocoders are begun, based on the format of PCM data, in which M-to-M communications are enabled when the bypass mode operations of the outgoing-end and incoming-end mobile stations coincide with each other. In accordance with the present invention, accordingly, it is possible to achieve smooth communications without a degradation in speech quality, as compared to conventional communications methods which do not take into consideration operation modes of outgoing-end and incoming-end mobile stations.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

I claim:

1. A method for controlling the bypass mode operation of a vocoder based on the format of pulse coded modulation (PCM) data, comprising:

mobile-to-mobile (M-to-M) recognition step for allowing a switching unit to recognize a bypass command contained in an alarm, received at the switching unit when an optional user requests a call service, informing of the request for the call service, and to recognize the request of the user to be the request for mobile-to-mobile communications between outgoing-end and incoming-end mobile stations;

incoming step for beginning a control for a bypass operation of a vocoder associated with the incoming-end mobile station when an output signal from the switching unit is received at the incoming-end mobile station after the execution of the mobile-to-mobile recognition step;

outgoing-end control step for controlling a bypass mode operation of a vocoder associated with the outgoing-end mobile station, based on data output from the incoming-end vocoder after the execution of the incoming step;

incoming-end control step for controlling a bypass mode operation of the incoming-end vocoder, based on data output from the outgoing-end vocoder after the execution of the incoming step; and communications step for enabling M-to-M communications when the outgoing-end and incoming-end bypass operations coincide with each other after the execution of the outgoing-end and incoming-end control steps.

2. The method in accordance with claim 1, wherein the outgoing-end control step comprises the steps of beginning a control for the bypass operation of the outgoing-end vocoder after the execution of the incoming step, checking the format of data output from the incoming-end vocoder, controlling the outgoing-end vocoder to operate in a vocoding mode when it is determined that the data output from the incoming-end vocoder is general data, and then checking again the format of data output from the incoming-end vocoder while controlling the outgoing-end vocoder to begin its bypass mode operation when it is determined that the data output from the incoming-end vocoder is PCM data.

3. The method in accordance with claim 1, wherein the incoming-end control step comprises the steps of checking the format of data output from the outgoing-end vocoder after the execution of the incoming step, controlling the incoming-end vocoder to operate in a vocoding mode when it is determined that the data output from the outgoing-end vocoder is general data, and then checking again the format of data output from the outgoing-end vocoder while controlling the incoming-end vocoder to begin its bypass mode operation when it is determined that the data output from the outgoing-end vocoder is PCM data.

4. The method in accordance with claim 1, wherein the outgoing-end and incoming-end control steps are executed in a simultaneous manner.

* * * * *